US007979550B2

(12) United States Patent
Xiao et al.

(10) Patent No.: US 7,979,550 B2
(45) Date of Patent: Jul. 12, 2011

(54) METHODS AND APPARATUSES FOR ADJUSTING BANDWIDTH ALLOCATION DURING A COLLABORATION SESSION

(76) Inventors: Sihai Xiao, Fremont, CA (US); Yanghua Liu, San Jose, CA (US)

( * ) Notice: Subject to any disclaimer, the term of this patent is extended or adjusted under 35 U.S.C. 154(b) by 261 days.

(21) Appl. No.: 11/753,156

(22) Filed: May 24, 2007

(65) Prior Publication Data

US 2008/0294758 A1 Nov. 27, 2008

(51) Int. Cl.
*G06F 15/173* (2006.01)
(52) U.S. Cl. ................ 709/226; 709/223; 709/224
(58) Field of Classification Search .................. None
See application file for complete search history.

(56) References Cited

U.S. PATENT DOCUMENTS

| | | | | |
|---|---|---|---|---|
| 5,649,105 A * | 7/1997 | Aldred et al. | ................ | 709/220 |
| 5,751,712 A * | 5/1998 | Farwell et al. | ................ | 370/431 |
| 5,796,724 A * | 8/1998 | Rajamani et al. | ................ | 370/263 |
| 6,396,816 B1 * | 5/2002 | Astle et al. | ................ | 370/264 |
| 6,453,336 B1 * | 9/2002 | Beyda et al. | ................ | 709/204 |
| 6,735,633 B1 * | 5/2004 | Welch et al. | ................ | 709/233 |
| 6,771,661 B1 * | 8/2004 | Chawla et al. | ................ | 370/468 |
| 6,876,668 B1 * | 4/2005 | Chawla et al. | ................ | 370/468 |
| 6,957,071 B1 * | 10/2005 | Holur et al. | ................ | 455/452.2 |
| 7,062,559 B2 * | 6/2006 | Yoshimura et al. | ................ | 709/226 |
| 7,299,284 B2 * | 11/2007 | McKinnon et al. | ................ | 709/225 |
| 7,564,872 B1 * | 7/2009 | Chawla et al. | ................ | 370/468 |
| 7,627,629 B1 * | 12/2009 | Wu et al. | ................ | 709/204 |
| 2002/0093983 A1 * | 7/2002 | Newberg et al. | ................ | 370/468 |
| 2002/0129143 A1 * | 9/2002 | McKinnon et al. | ................ | 709/225 |
| 2002/0181686 A1 * | 12/2002 | Howard et al. | ................ | 379/202.01 |
| 2003/0018719 A1 * | 1/2003 | Ruths et al. | ................ | 709/205 |
| 2003/0069972 A1 * | 4/2003 | Yoshimura et al. | ................ | 709/226 |
| 2004/0015602 A1 * | 1/2004 | Goldhammer et al. | ................ | 709/235 |
| 2004/0153504 A1 * | 8/2004 | Hutchinson et al. | ................ | 709/204 |
| 2004/0199580 A1 * | 10/2004 | Zhakov et al. | ................ | 709/204 |
| 2005/0272438 A1 * | 12/2005 | Holur et al. | ................ | 455/452.2 |
| 2007/0064732 A1 * | 3/2007 | Liaw et al. | ................ | 370/468 |
| 2007/0180119 A1 * | 8/2007 | Khivesara et al. | ................ | 709/226 |
| 2008/0040746 A1 * | 2/2008 | Shae et al. | ................ | 725/44 |
| 2008/0112337 A1 * | 5/2008 | Shaffer et al. | ................ | 370/260 |
| 2008/0294758 A1 * | 11/2008 | Xiao et al. | ................ | 709/221 |
| 2010/0088414 A1 * | 4/2010 | Lin et al. | ................ | 709/227 |
| 2010/0192213 A1 * | 7/2010 | Ta et al. | ................ | 726/7 |

FOREIGN PATENT DOCUMENTS

WO WO2005/104490 A1 11/2005

OTHER PUBLICATIONS

PCT Notification of Transmittal of the International Search Report and the Written Opinion of the International Searching Authority, or the Declaration, International Application No. PCT/US2008/006619, International Filing Date: May 23, 2008, Date of Document Mailing: Oct. 6, 2008, 11 pages.

\* cited by examiner

*Primary Examiner* — David E England
(74) *Attorney, Agent, or Firm* — Cesari and McKenna, LLP

(57) ABSTRACT

In one embodiment, the systems and methods determine an initial bandwidth at a client device; allocate an allocated bandwidth to the client device between a first server and a second server; monitor the allocated bandwidth; and adjust the allocated bandwidth based on a target bandwidth from the first server to the client.

26 Claims, 5 Drawing Sheets

METHODS AND APPARATUSES FOR ADJUSTING BANDWIDTH ALLOCATION DURING A COLLABORATION SESSION

FIELD OF INVENTION

The present invention relates generally to adjusting bandwidth and, more particularly, to adjusting bandwidth during a collaboration session.

BACKGROUND

There has been an increased use in collaboration sessions that are Internet or web-based to communicate with employees, vendors, and clients. During these collaboration sessions, information is typically exchanged between multiple participants. This exchanged information or content may include audio, graphical, and/or textual information. Different types of content have different delivery requirements in terms of timeliness of delivery and the size of the content.

SUMMARY

In one embodiment, the systems and methods determine an initial bandwidth at a client device; allocate an allocated bandwidth to the client device between a first server and a second server; monitor the allocated bandwidth; and adjust the allocated bandwidth based on a target bandwidth from the first server to the client.

BRIEF DESCRIPTION OF THE DRAWINGS

The accompanying drawings, which are incorporated in and constitute a part of this specification, illustrate and explain one embodiment of the methods and apparatuses for adjusting bandwidth allocation during a collaboration session. In the drawings.

DETAILED DESCRIPTION

The following detailed description of the methods and apparatuses for adjusting bandwidth allocation during a collaboration session refers to the accompanying drawings. The detailed description is not intended to limit the methods and apparatuses for adjusting bandwidth allocation during a collaboration session. Instead, the scope of the methods and apparatuses for adjusting bandwidth allocation during a collaboration session is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to content include audio, video, graphical, and/or textual data.

References to a collaboration session include a plurality of devices that are configured to view content submitted by one of the devices.

References to a participant device include devices that are participating in the collaboration session.

References to a presenter device include a device that is a participant in the collaboration session and shares content shared with other participants.

References to an attendee device include a device that is a participant in the collaboration session and receives content shared by another participant device. The attendee devices are capable of receiving and presenting to users in a user discernable format content that is offered by the presenter device. In some instances, the attendee devices are capable of modifying the content shared by the presenter device.

Figure 1:
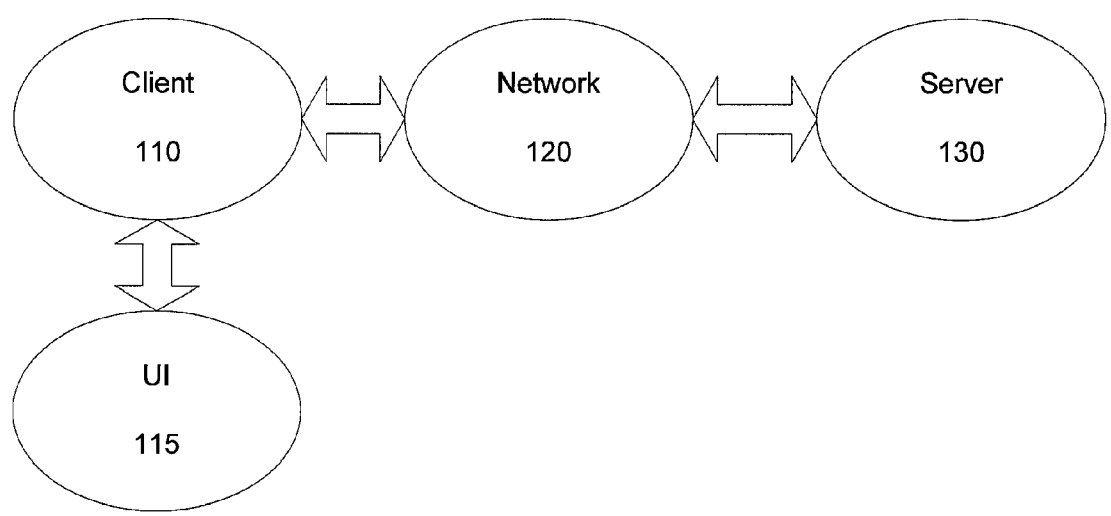
FIG. 1 is a diagram illustrating an environment within which the methods and apparatuses for adjusting bandwidth allocation during a collaboration session are implemented.

FIG. 1 is a diagram illustrating an environment within which the methods and apparatuses for adjusting bandwidth allocation during a collaboration session are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., a keypad, a video display screen, input and output interfaces, etc., in the same housing such as a personal digital assistant). In other embodiments, one or more user interface 115 components (e.g., a keyboard, a pointing device such as a mouse, a trackball, a microphone, a speaker, a display, a camera, etc.) are physically separate from, and are conventionally coupled to, the electronic device 110. In one embodiment, the user utilizes interface 115 to access and control content and applications stored in electronic device 110, server 130, or a remote storage device (not shown) coupled via network 120.

In accordance with the invention, embodiments of adjusting bandwidth allocation during a collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
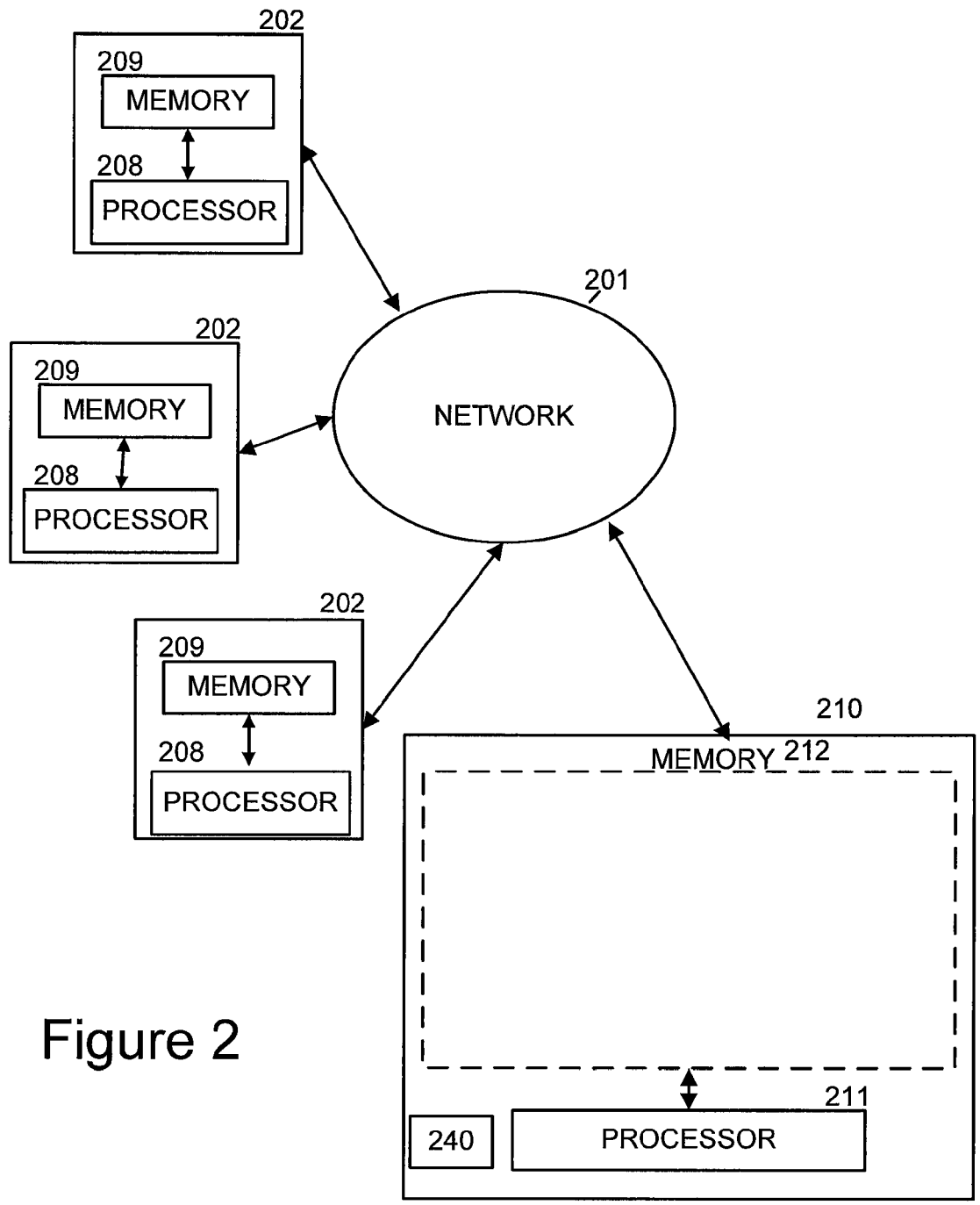
FIG. 2 is a simplified block diagram illustrating one embodiment in which the methods and apparatuses for adjusting bandwidth allocation during a collaboration session are implemented.

FIG. 2 is a simplified diagram illustrating an exemplary architecture in which the methods and apparatuses for adjusting bandwidth allocation during a collaboration session are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for selectively sharing a portion of a display during a collaboration session. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on adjusting bandwidth allocation during a collaboration session as determined using embodiments described below.

Figure 3:
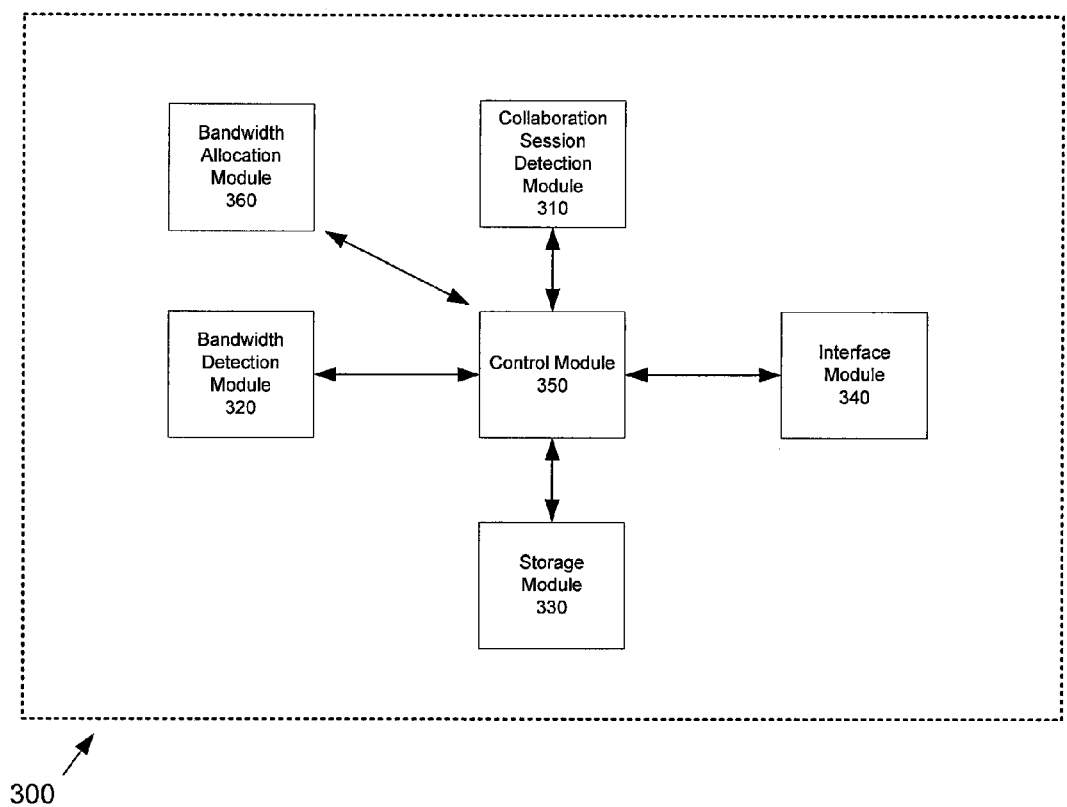
FIG. 3 is a simplified block diagram illustrating a system, consistent with one embodiment of the methods and apparatuses for adjusting bandwidth allocation during a collaboration session.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a collaboration session detection module 310, a bandwidth detection module 320, a storage module 330, an interface module 340, a control module 350, and a bandwidth allocation module 360.

In one embodiment, the control module 350 communicates with the collaboration session detection module 310, the bandwidth detection module 320, the storage module 330, the interface module 340, and the bandwidth allocation module 360. In one embodiment, the control module 350 coordinates tasks, requests, and communications between the collaboration session detection module 310, the bandwidth detection module 320, the storage module 330, the interface module 340, and the bandwidth allocation module 360.

In one embodiment, the collaboration detection module 310 detects a collaboration session between multiple participants. In one embodiment, the collaboration session includes sharing content among the participants through a display device. For example, voice and data content may be shared through the display device such as a computer system, a cellular phone, a personal digital assistant, and the like.

Further, the content may include graphical and textual data through word processors, chat windows, documents, and the like.

In one embodiment, the bandwidth detection module 320 determines a specific available bandwidth at a participant's device. In one embodiment, the specific available bandwidth is determined based on the connection type of the participant's device. For example, the connection type includes a telephone modem connection, Wifi connection, a DSL connection, a T1 line, and the like. In this embodiment, different available bandwidths are associated with the different connection types without measuring the actual bandwidth available to the participant's device.

In another embodiment, the specific available bandwidth at the participant's device is determined by measuring the actual available bandwidth. In this embodiment, transmission of test data may be utilized to measure the available bandwidth at the participant's device. In one embodiment, the measurement of the available bandwidth for the participant's device is performed at the participant's device.

In one embodiment, the storage module 330 stores content associated with the allocating bandwidth to the participant's device for the collaboration session. Further, the storage module 330 is also configured to store information corresponding to the participants of the collaboration session. Further yet, the storage module 330 is also configured to store content shared during the collaboration session.

In one embodiment, the interface detection module 340 detects when the text messages are being transmitted from one of the devices participating in the collaboration session. In another embodiment, the interface detection module 340 monitors the voice transmissions originating from one of the devices participating in the collaboration session. In yet another embodiment, the interface detection module 340 detects any activity by one of the devices participating in the collaboration session.

In one embodiment, the interface module 340 receives a signal from one of the electronic devices 110. In one embodiment, the electronic devices 110 are participating in a collaboration session. In another embodiment, the interface module 340 delivers a signal to one of the electronic devices 110.

In one embodiment, the bandwidth allocation module 360 determines how much bandwidth is allocated to various types of content that is shared within the collaboration session. In one embodiment, different types of content include audio data, video data, graphical data, and textual data. In some embodiments, audio data and video data require deliver to various participant devices more quickly than other types of shared content within a collaboration session. In one example, the audio and video data are delivered in as close to real time as possible. For example, voice that is embodied within the audio data is less useful when delayed and may contribute to a deterioration in user experience when prolonged voice latency occurs. Similarly, video data that suffers lengthy delays from receipt by the participant device degrade the overall user experience within the collaboration session. In one embodiment, the voice data is given higher priority than the video data.

In one embodiment, different percentages of bandwidth availability are allocated to different types of content. For example, Equation 1 below describes the current bandwidth to receive data (CBW) in relation to the initial available network bandwidth (IBW) and the expected bandwidth to send VoIP packets (C). In another embodiment, C can represent any data that has a high priority for delivery.

$$CBW = IBW - C \quad \text{(Equation 1)}$$

In one embodiment, the CBW is subsequently adjusted based Equation 2 found below.

$$VBV = C - VCR \quad \text{(Equation 2)}$$

The VoIP bandwidth variant is represented by VBV; and VoIP receiving rate and bandwidth detecting data are represented by VCR. In one embodiment, the participant's device periodically detects the VCR to calculate the VBV. If the VBV is less than zero, then greater bandwidth can be allocated to data and the CBW can be increased without decreasing the throughput of the VoIP packets. Similarly, if the VBV is greater than zero, then less bandwidth can be allocated to data and the CBW can be decreased to maintain acceptable throughput for the VoIP packets.

In one embodiment, the adjustment of the bandwidth allocation is made over a predetermined period of time. In another embodiment, the adjustment of the bandwidth allocation is also adjusted as a percentage of the overall bandwidth.

In one embodiment, one or more functions associated with the bandwidth detection module 320 and bandwidth allocation module 360 are performed locally within the participant's device.

The system 300 in FIG. 3 is shown for exemplary purposes and is merely one embodiment of the methods and apparatuses for adjusting bandwidth allocation during a collaboration session. Additional modules may be added to the system 300 without departing from the scope of the methods and apparatuses for adjusting bandwidth allocation during a collaboration session. Similarly, modules may be combined or deleted without departing from the scope of the methods and apparatuses for adjusting bandwidth allocation during a collaboration session.

Figure 4:
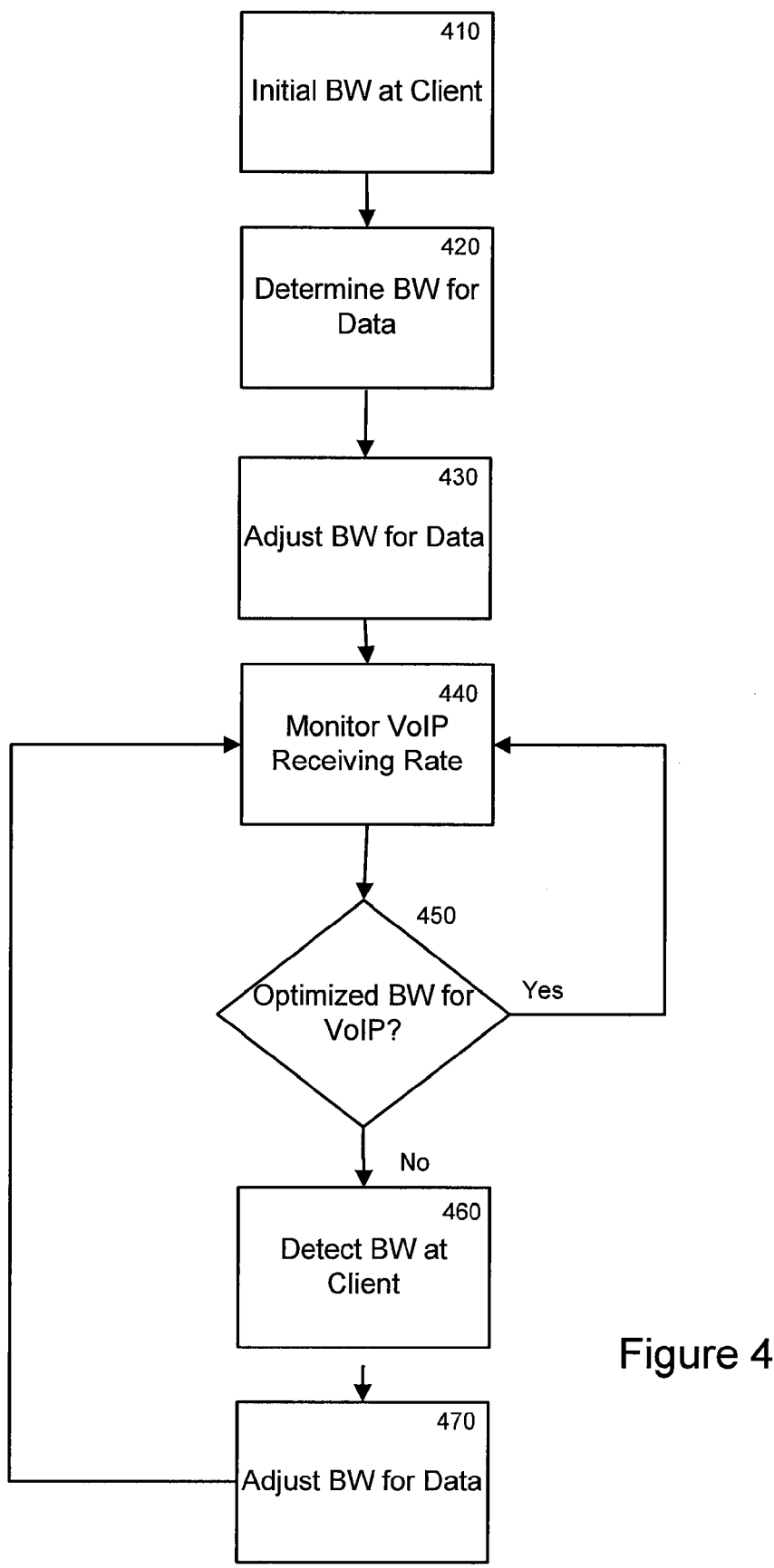
FIG. 4 is a flow diagram consistent with one embodiment of the methods and apparatuses for adjusting bandwidth allocation during a collaboration session.

The flow diagram as depicted in FIG. 4 is one embodiment of the methods and apparatuses for adjusting bandwidth allocation during a collaboration session. The blocks within the flow diagram can be performed in a different sequence without departing from the spirit of the methods and apparatuses for adjusting bandwidth allocation during a collaboration session. Further, blocks can be deleted, added, or combined without departing from the spirit of the methods and apparatuses for adjusting bandwidth allocation during a collaboration session.

The flow diagram in FIG. 4 illustrates adjusting bandwidth allocation during a collaboration session according to one embodiment of the invention.

In Block 410, an initial bandwidth is detected at the client. In one embodiment, the client represents the participant's device within a collaboration session. In one embodiment, the initial bandwidth is detected by the bandwidth detection module 320. In one embodiment, the actual bandwidth to the client is detected. In another embodiment, the initial bandwidth is assigned based on the connection type associated with the client.

In Block 420, bandwidth allocation for data is determined. In one embodiment, the formula shown in Equation 1 is utilized to determine the bandwidth allocation for data.

In Block 430, the bandwidth allocation for data is adjusted based on the bandwidth determined within the Block 430. In one embodiment, the bandwidth allocation for data allocation is transmitted from the client to a remote server. Further, the client represents the participant's device in one embodiment, and the remote server represents a collaboration session server.

In Block 440, the VoIP receiving rate is monitored. In one embodiment, the VoIP receiving rate is monitored at the client. In another embodiment, the VoIP receiving rate is monitored at a remote server.

In Block 450, if the bandwidth allocated to the VoIP receiving rate is optimized, then the VoIP receiving rate is continued to be monitored within the Block 440.

In Block 450, if the bandwidth for the VoIP is not optimized, then the current bandwidth is detected at the client in Block 460. In one embodiment, the current bandwidth is detected by the bandwidth detection module 320.

In one embodiment, the optimization is determined based on the allocation of the data bandwidth and the VoIP bandwidth. An exemplary relationship for bandwidth allocation is illustrated within Equation 2.

Figure 5:
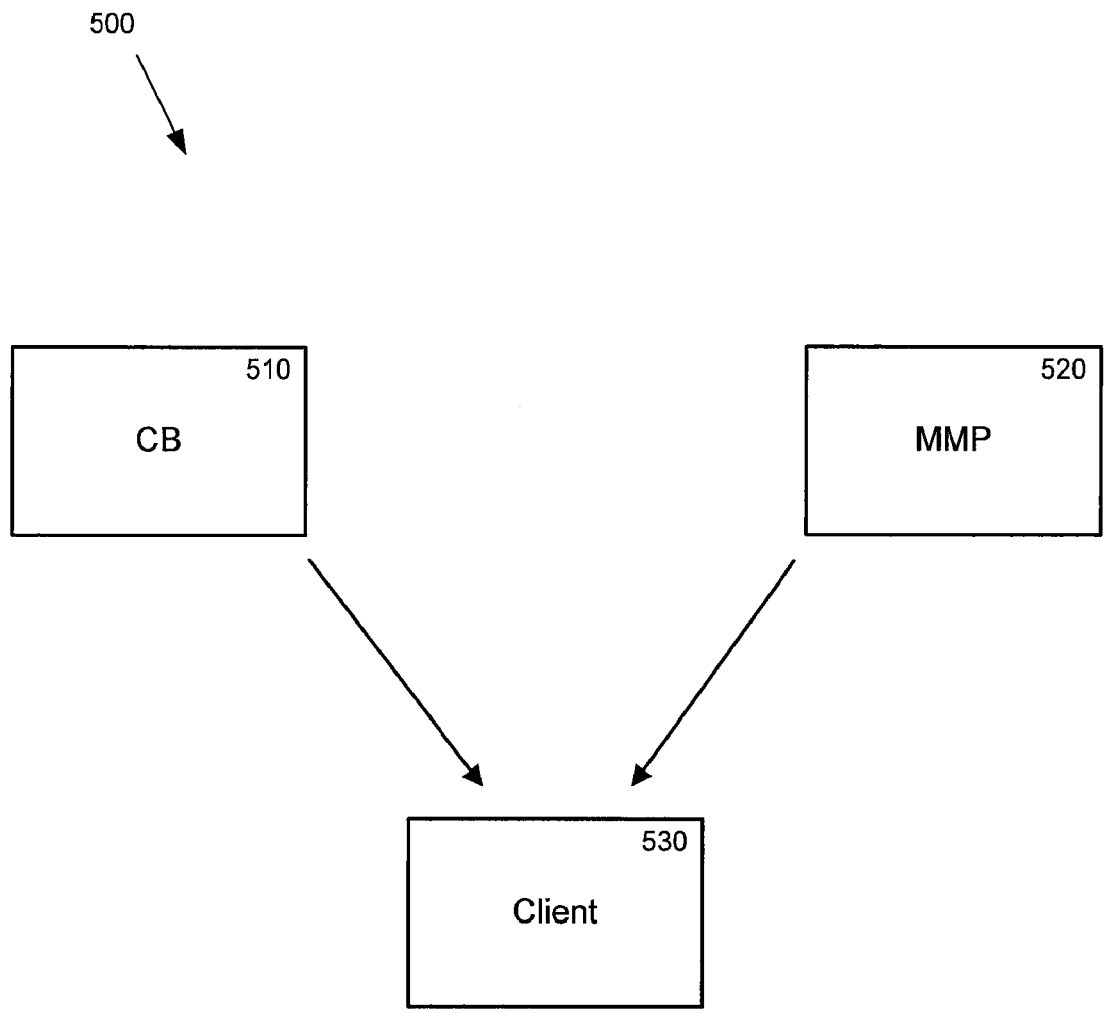
FIG. 5 is a simplified block diagram illustrating one embodiment in which the methods and apparatuses for adjusting bandwidth allocation during a collaboration session are implemented.

In Block 470, the bandwidth for data is adjusted based on the optimization in the Block 450 and the current bandwidth detected in the Block 460. FIG. 5 illustrates one embodiment of a system 500. In one embodiment, the system 500 is embodied within the server 130. In another embodiment, the system 500 is embodied within the electronic device 110. In yet another embodiment, the system 500 is embodied within both the electronic device 110 and the server 130.

In one embodiment, the system 500 includes a meeting server 510, a multimedia server 520, and a client 530. In one embodiment, the meeting server 510 distributes chat data, document data, file data, and the like to the client 530. In one embodiment, the multimedia server 520 distributes VoIP data and video data to the client 530. In one embodiment, the client represents a device utilized by a participant within a collaboration session and receives data from both the meeting server 510 and the multimedia server 520.

In one embodiment, the bandwidth allocation, as described above and illustrated within FIGS. 3 and 4, divides the available bandwidth between the meeting server 510 and the multimedia server 520.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   determining an initial available bandwidth for a client device participating in a collaboration session with other client devices, the collaboration session including an exchange of voice data and of non-voice data;
   allocating a first bandwidth to the non-voice data exchanged by the client device and a server during the collaboration session;
   monitoring, during the collaboration session, a second bandwidth for the voice data exchanged by the client device during the collaboration session; and
   adjusting, during the collaboration session, the first allocated bandwidth for the non-voice data based on a comparison, during the collaboration session, of the voice data's second monitored bandwidth to a target bandwidth of the voice data.

2. The method according to claim 1 wherein the target bandwidth corresponds to a target for transmission of the voice data.

3. The method according to claim 1 wherein a second server transmits the voice data for the collaboration session to the client device.

4. The method according to claim 1 further comprising:
   calculating the allocated first bandwidth based on the initial available bandwidth.

5. The method according to claim 4 further comprising:
calculating the allocated first bandwidth based on CBW=IBW−C wherein CBW represents the allocated first bandwidth, IBW represents the initial available bandwidth, and C represents the target bandwidth.

6. The method according to claim 1 wherein determining the initial available bandwidth further comprises:
measuring a throughput of data at the client device.

7. The method according to claim 1 wherein the initial available bandwidth is based on a connection type associated with the client device.

8. The method according to claim 7 wherein the connection type includes one of a DSL connection, a telephone connection, a WiFi connection, and a T1 connection.

9. The method according to claim 1 wherein the adjusting is based on VBV=C−VCR wherein VBV represents a Voice over Internet Protocol (VoIP) bandwidth variant, VCR represents a detected VoIP bandwidth receiving rate and bandwidth, and C represents the target bandwidth.

10. The method according to claim 1 wherein the adjusting further comprises:
increasing the allocated bandwidth for the non-voice data exchanged between the client device and the server when the second monitored bandwidth of the voice data is less than the target bandwidth for the voice data.

11. The method according to claim 1 wherein the adjusting further comprises:
decreasing the allocated bandwidth for the non-voice data exchanged between the client device and the server when the second monitored bandwidth of the voice data is greater than the target bandwidth for the voice data.

12. A system, comprising:
a processor;
a memory storing program instructions that when executed by the processor implement one or more modules;
a collaboration session detection module configured to detect a collaboration session between a client device and other client devices, the collaboration session including an exchange of voice data and of non-voice data;
a bandwidth allocation module configured to assign a first bandwidth to the non-voice data exchanged between the client device and a server during the collaboration session;
a bandwidth detection module configured to detect an initial bandwidth available to the client device, and further configured to monitor, during the collaboration session, a second bandwidth of the voice data exchanged by the client device during the collaboration session; and
the bandwidth allocation module further configured to adjust, during the collaboration session, the first assigned bandwidth for the non-voice data based on a comparison of the voice data's second monitored bandwidth to a target bandwidth for the voice data.

13. The system according to claim 12 further comprising a storage module configured to store content shared during the collaboration session.

14. The system according to claim 12 wherein the voice data is exchanged between the client device and a second server.

15. The system according to claim 12 wherein the bandwidth allocation module is further configured to:
increase the assigned bandwidth of the non-voice data to the client device from the server when the second monitored bandwidth of the voice data is less than the target bandwidth of the voice data.

16. The system according to claim 12 wherein the bandwidth allocation module is further configured to:
decrease the allocated bandwidth of the non-voice data to the client device from the server when the second monitored bandwidth of the voice data is greater than the target bandwidth of the voice data.

17. An apparatus comprising:
a processor;
a memory;
means for determining an initial available bandwidth for a collaboration session between the apparatus and one or more other client devices, the collaboration session including an exchange of voice data and of non-voice data;
means for allocating a first bandwidth to the non-voice data exchanged by the apparatus during the collaboration session;
means for monitoring, during the collaboration session, a second bandwidth for the voice data exchanged by the apparatus during the collaboration session; and
means for adjusting, during the collaboration session, the first allocated bandwidth for the non-voice data based on a comparison of the voice data's second monitored bandwidth to a target bandwidth of the voice data.

18. A method comprising:
determining an initial available bandwidth at a client device participating in a collaboration session, the collaboration session including an exchange of voice data and of non-voice data;
based on the initial available bandwidth and an expected second bandwidth needed at the client device for the voice data utilized during the collaboration session, allocating a first bandwidth at the client device for the non-voice data utilized during the collaboration session;
monitoring, during the collaboration session, an actual second bandwidth utilized at the client device for the voice data utilized during the collaboration session;
comparing, during the collaboration session, the expected second bandwidth needed at the client device for the voice data utilized during the collaboration session, to the monitored actual second bandwidth utilized at the client device for the voice data during the collaboration session, and determining therefrom a bandwidth variant; and
based on the determined bandwidth variant, adjusting, during the collaboration session, the first bandwidth allocated at the client device for the non-voice data utilized during the collaboration session to use a portion of the previously allocated first bandwidth, while continuing to utilize the remainder of the previously allocated first bandwidth for the voice data for the collaboration session.

19. The method according to claim 18 wherein the voice data is Voice over Internet protocol (VoIP) data.

20. The method according to claim 18 further comprising:
passing the non-voice data for the collaboration session between the client device and a first server; and
passing the voice data for the collaboration session between the client device and a second server.

21. The method according to claim 18 wherein the initial available bandwidth is estimated based on a connection type of the client device.

22. The method according to claim 18 wherein the allocating bases the first bandwidth on the initial available bandwidth and the expected bandwidth needed for the voice data by evaluating a formula:

CBW=IBW−C where CBW represents the first bandwidth, IBW represents the initial available bandwidth and C represents expected second bandwidth needed for the voice data.

23. The method according to claim 18 wherein the comparing determines therefrom the bandwidth variant by evaluating a formula:

VBV=C−VCR where VBV represents the bandwidth variant, C represents the expected second bandwidth needed for the voice data, and VCR represents the monitored actual second bandwidth needed for the voice data.

24. An apparatus comprising:
a processor; and
a memory storing program instructions that, when executed on the processor, are operable to
  determine an initial available bandwidth for use by a collaboration session that includes an exchange of voice data and of non-voice data,
  based on the initial available bandwidth and an expected second bandwidth needed for the voice data utilized during the collaboration session, allocate a first bandwidth for the non-voice data utilized during the collaboration session,
  monitor, during the collaboration session, an actual second bandwidth needed for the voice data utilized during the collaboration session,
  compare, during the collaboration session, the expected second bandwidth needed for the voice data utilized during the collaboration session to the monitored actual second bandwidth needed for the voice data utilized during the collaboration session, and determine therefrom a bandwidth variant, and
  based on the determined bandwidth variant, adjust, during the collaboration session, the first bandwidth allocated for the non-voice data utilized during the collaboration session to use a portion of the previously allocated first bandwidth, while continuing to utilize the remainder of the previously allocated first bandwidth for the voice data for the collaboration session.

25. The apparatus according to claim 24 wherein the voice data is Voice over Internet Protocol (VoIP) data.

26. The apparatus according to claim 24 wherein the program instruction, when executed on the processor, are further operable to pass the non-voice data utilized during the collaboration session between the apparatus and a first server and to pass the voice data utilized during the collaboration session between the apparatus and a second server.

* * * * *